(12) United States Patent
Smith et al.

(10) Patent No.: US 11,234,355 B2
(45) Date of Patent: Feb. 1, 2022

(54) SYSTEM AND METHOD FOR MANAGING MATERIAL ACCUMULATION RELATIVE TO GROUND ENGAGING TOOLS OF AN AGRICULTURAL IMPLEMENT

(71) Applicant: CNH Industrial America LLC, New Holland, PA (US)

(72) Inventors: Kevin M. Smith, Narvon, PA (US); Joshua David Harmon, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 273 days.

(21) Appl. No.: 16/668,422

(22) Filed: Oct. 30, 2019

(65) Prior Publication Data

US 2021/0127546 A1    May 6, 2021

(51) Int. Cl.
| | | |
|---|---|---|
| *A01B 63/111* | (2006.01) | |
| *A01B 63/00* | (2006.01) | |
| *A01B 47/00* | (2006.01) | |
| *A01C 5/06* | (2006.01) | |
| *A01B 71/08* | (2006.01) | |

(52) U.S. Cl.
CPC ............ *A01B 63/111* (2013.01); *A01B 47/00* (2013.01); *A01B 63/008* (2013.01); *A01C 5/064* (2013.01); *A01B 71/08* (2013.01)

(58) Field of Classification Search
CPC ..... A01B 47/00; A01B 63/008; A01B 63/111; A01B 79/005; A01C 5/064
See application file for complete search history.

(56) References Cited

U.S. PATENT DOCUMENTS

| | | | |
|---|---|---|---|
| 8,365,679 B2 * | 2/2013 | Landphair | A01B 76/00 111/200 |
| 8,418,636 B2 | 4/2013 | Liu et al. | |
| 8,930,095 B2 | 1/2015 | Anderson | |

(Continued)

FOREIGN PATENT DOCUMENTS

DE    102017112224 A1    12/2018

OTHER PUBLICATIONS

V.I. Adamchuk et al., "One-the-Go Soil Sensors for Precision Agriculture," Biological Systems Engineering: Papers and Publications, University of Nebraska—Lincoln DigitalCommons@University of Nebraska—Lincoln, Jun. 2004, https://digitalcommons.unl.edu/cgi/viewcontent.cgi?article=1000&context=biosysengfacpub.

*Primary Examiner* — Thomas B Will
*Assistant Examiner* — Ian A Normile
(74) *Attorney, Agent, or Firm* — Rebecca L. Henkel; Rickard K. DeMille

(57) ABSTRACT

A system for managing material accumulation relative to an agricultural implement may include a ground engaging tool supported on an agricultural implement and an infrared sensor having a field of view directed towards the ground engaging tool. The infrared sensor may be configured to generate data indicative of a temperature gradient of field materials at the ground engaging tool. A controller of the system may be communicatively coupled to the infrared sensor. The controller may monitor the data received from the infrared sensor and determine a presence of material accumulation relative to the ground engaging tool based at least in part on the temperature gradient of the field materials at the ground engaging tool.

20 Claims, 5 Drawing Sheets

(56) References Cited

U.S. PATENT DOCUMENTS

| | | |
|---|---|---|
| 9,405,039 B2 | 8/2016 | Anderson |
| 9,485,900 B2 | 11/2016 | Connell et al. |
| 10,080,323 B2 | 9/2018 | Lund et al. |
| 10,182,693 B2 | 1/2019 | Landry et al. |
| 10,188,035 B2 | 1/2019 | Reich et al. |
| 10,219,430 B2 | 3/2019 | Blomme et al. |
| 2011/0166705 A1* | 7/2011 | Anderson ............ B62D 57/032 700/253 |
| 2019/0323190 A1* | 10/2019 | Waelbers ............. G05D 1/0011 |
| 2021/0112698 A1* | 4/2021 | Ekhe ...................... A01C 14/00 |

* cited by examiner

SYSTEM AND METHOD FOR MANAGING MATERIAL ACCUMULATION RELATIVE TO GROUND ENGAGING TOOLS OF AN AGRICULTURAL IMPLEMENT

FIELD OF THE INVENTION

The present disclosure relates generally to plugging or material accumulation and, more particularly, to systems and methods for managing material accumulation relative to ground engaging tools of an agricultural implement.

BACKGROUND OF THE INVENTION

It is well known that, to attain the best agricultural performance from a field, a farmer must cultivate the sod, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, field materials, such as residue, soil, rocks, and/or the like, may become trapped or otherwise accumulate between adjacent ground engaging tools. Such accumulations of field materials may inhibit the operation of the ground engaging tools in a manner that prevents the tools from providing adequate tillage to the field. In such instances, it is necessary for the operator to take certain corrective actions to remove the material accumulation. However, it may be difficult for the tillage implement operator to determine when material accumulation occurs between the ground engaging tools.

Accordingly, a system and related method for managing material accumulation relative to ground engaging tools of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for managing material accumulation relative to an agricultural implement. The system includes a ground engaging tool supported on an agricultural implement and an infrared sensor having a field of view directed towards the ground engaging tool. The infrared sensor is configured to generate data indicative of a temperature gradient of field materials at the ground engaging tool. Additionally, the system includes a controller communicatively coupled to the infrared sensor. The controller is configured to monitor the data received from the infrared sensor and determine a presence of material accumulation relative to the ground engaging tool based at least in part on the temperature gradient of the field materials at the ground engaging tool.

In another aspect, the present subject matter is directed to a method for managing material accumulation relative to an agricultural implement as the agricultural implement performs an agricultural operation within a field. The method includes receiving, with a computing device, data indicative of a temperature gradient of field materials at a ground engaging tool of the agricultural implement. Moreover, the method includes identifying, with the computing device, a presence of material accumulation relative to the ground engaging tool based at least in part on the temperature gradient of the field materials at the ground engaging tool. Additionally, the method includes initiating, with the computing device, a control action associated with managing an amount of material accumulation relative to the ground engaging tool.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
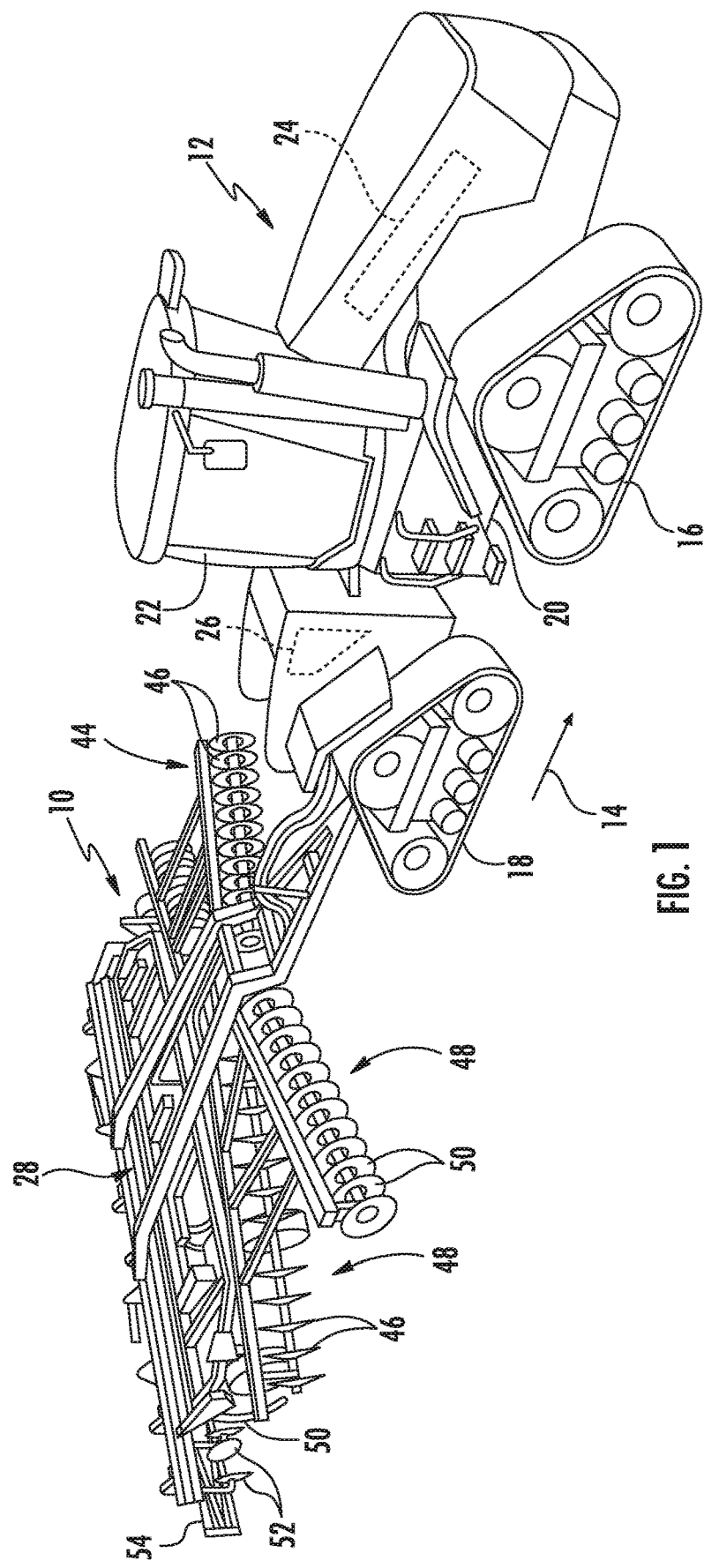
FIG. 1 illustrates a perspective view of one embodiment of an agricultural implement coupled to a work vehicle in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for managing material accumulation relative to ground engaging tools of an agricultural implement. Specifically, in several embodiments, a controller of the disclosed system may be configured to receive data from one or more infrared sensors as the implement is being moved across a field. The infrared sensor(s) may measure heat of the field materials at the ground engaging tools (e.g., disks, etc.), which allows a temperature gradient of the field materials to be determined. Typically, residue across a field has a higher temperature than soil below the residue. During normal operation, the tillage tools create a mixing effect between the warmed residue and cooler soil such that a temperature gradient or differential at the ground engaging tools (e.g., of the field materials at the ground engaging tools) is detected by the infrared sensors as the implement is moved across the field. However, as residue accumulates on the ground engaging tools, the infrared sensors see less variation in the field materials at the ground engaging tools over time, due to the residue being static on the ground engaging tools, such that the temperature gradient decreases when material accumulation is present.

Thus, in accordance with aspects of the present subject matter, a controller may be configured to monitor the temperature gradient of the field materials at the ground engaging tools to determine when residue has accumulated relative to the ground engaging tools. For instance, in one embodiment, the controller may determine that material accumulation is present relative to one of the ground engaging tools when the temperature gradient of the field materials at the ground engaging tool is below a gradient threshold associated with a plugged operating condition. In some embodiments, the temperature gradients of field materials at two or more ground engaging tools may be compared to each other to determine when the ground engaging tools have become plugged with field materials. Once it is determined that the ground engaging tools have become plugged, the controller may perform one or more control actions. For example, the controller may be configured to indicate the plugged condition of the monitored ground engaging tools (e.g., via a user interface) to the operator and/or adjust the operation of the implement, such as by increasing or decreasing the penetration depth of the ground engaging tools and/or slowing down or stopping the implement.

Figure 2:
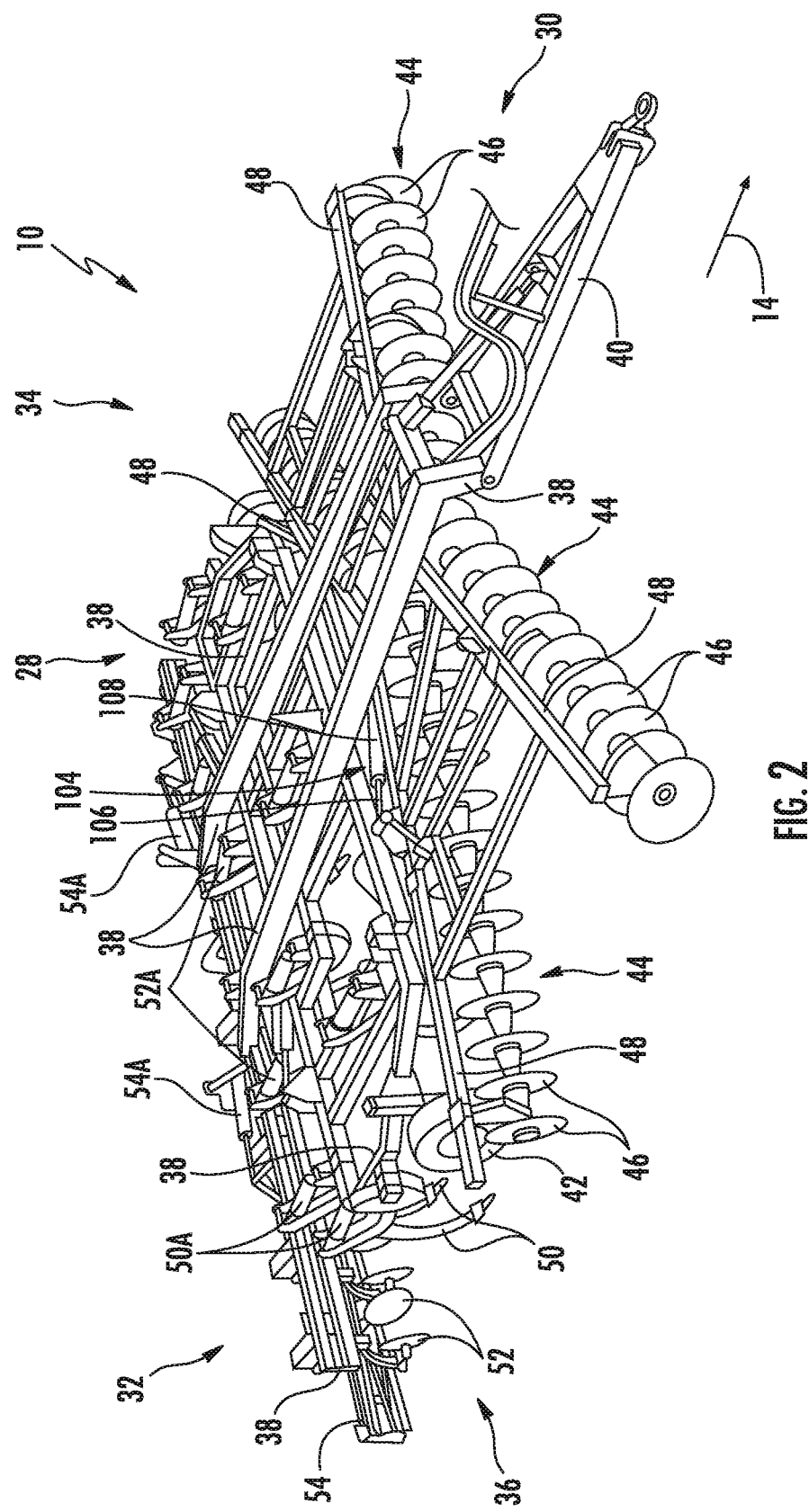
FIG. 2 illustrates another perspective view of the agricultural implement shown in FIG. 1 in accordance with aspects of the present subject matter, particularly illustrating various ground engaging tools and/or assemblies of the implement.

Referring now to the drawings. FIGS. 1 and 2 illustrate differing perspective views of one embodiment of an agricultural implement 10 in accordance with aspects of the present subject matter. Specifically, FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 5) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) via axles if multiple drive axles are employed).

As shown in FIGS. 1 and 2, the implement 10 may include a frame 28. More specifically, the frame 28 may extend longitudinally between a forward end 30 and an aft end 32. The frame 28 may also extend laterally between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46. Each disk blade 46 may, in turn, be configured to penetrate into or otherwise engage the soil as the implement 10 is being pulled through the field. In this regard, the various disk gangs 44 may be oriented at an angle relative to the direction of travel 14 to promote more effective tilling of the soil. In the embodiment shown in FIGS. 1 and 2, the implement 10 includes four disk gangs 44 supported on the frame 28 adjacent to its forward end 30. However, it should be appreciated that, in alternative embodiments, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (FIG. 2), with each actuator 104 being configured to move or otherwise adjust the orientation or position of one of the disk gangs 44 relative to the implement frame 28. For example, as shown in the illustrated embodiment, a first end of each actuator 104 (e.g., a rod 106 of the actuator 104) may be coupled to a support arm 48 of the corresponding disk gang 44, while a second end of each actuator 104 (e.g., the cylinder 108 of the actuator 104) may be coupled to the frame 28. The rod 106 of each actuator 104 may be configured to extend and/or retract relative to the corresponding cylinder 108 to adjust the angle of the corresponding disk gang 44 relative to a lateral centerline (not shown) of the frame 28 and/or the penetration depth of the associated disk blades 46. In the illustrated embodiment, each actuator 104 corresponds to a fluid-driven actuator, such as a hydraulic or pneumatic cylinder. However, it should be appreciated that each actuator 104 may correspond to any other suitable type of actuator, such as an electric linear actuator.

Additionally, as shown, in one embodiment, the implement frame 28 may be configured to support other ground engaging tools. For instance, in the illustrated embodiment, the frame 28 is configured to support a plurality of shanks 50 or a plurality of tines (not shown) configured to rip or otherwise till the soil as the implement 10 is towed across the field. Furthermore, in the illustrated embodiment, the frame 28 is also configured to support a plurality of leveling blades or disks 52 and rolling (or crumbler) basket assemblies 54. The implement 10 may further include shank frame actuator(s) 50A, leveling disk actuator(s) 52A, and/or basket assembly actuator(s) 54A configured to move or otherwise adjust the orientation or position of the shanks 50, leveling disks 52, and the basket assemblies 54, respectively, relative to the implement frame 28. It should be appreciated that, in other embodiments, any other suitable ground-engaging tools may be coupled to and supported by the implement frame 28, such as a plurality closing disks.

It should also be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations.

Figure 3:
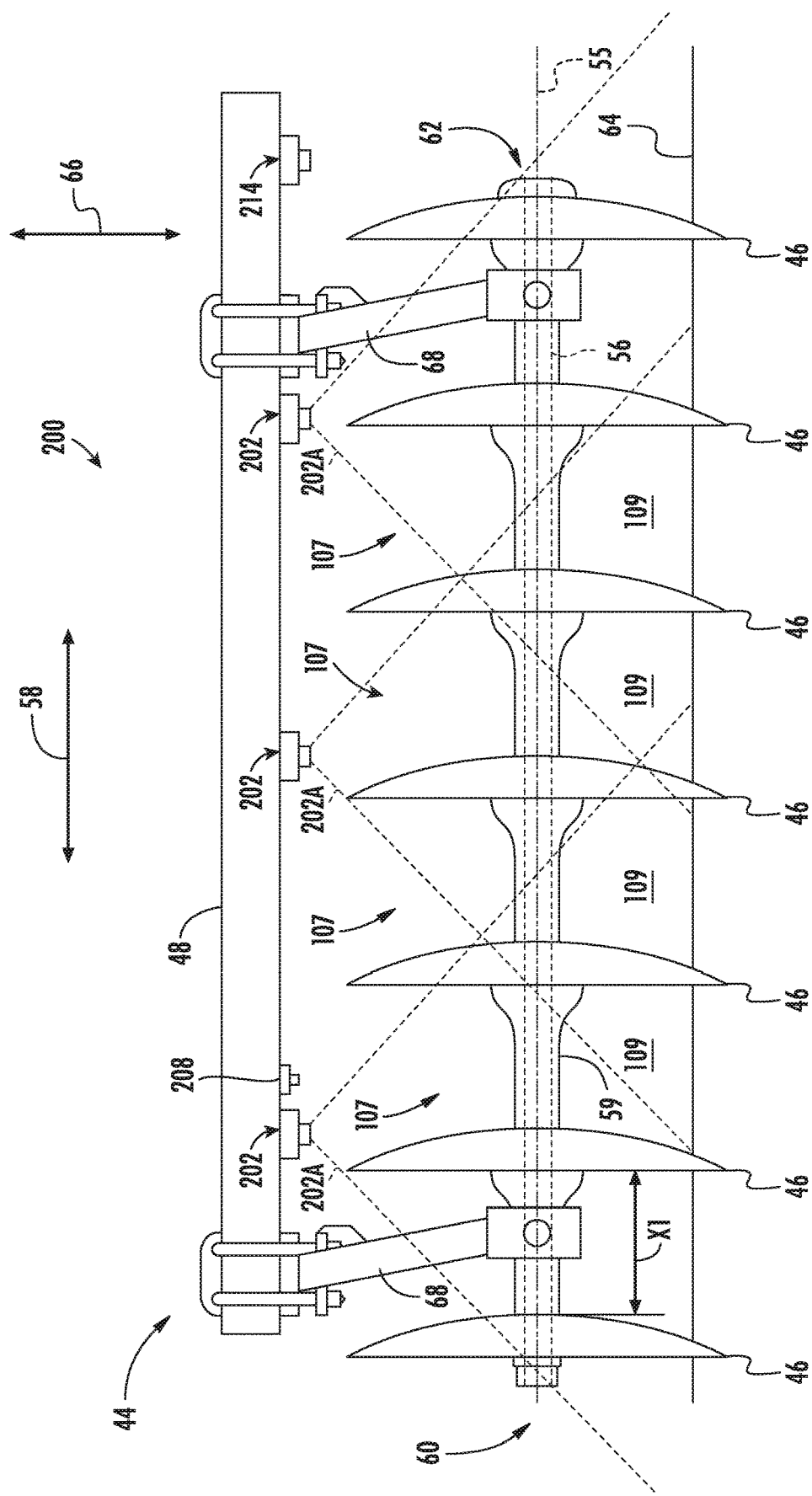
FIG. 3 illustrates a front view of one embodiment of a ground engaging assembly of an agricultural implement in accordance with aspects of the present subject matter, particularly illustrating one embodiment of a sensing assembly suitable for use in managing material accumulation relative to the ground engaging assembly.

Referring now to FIG. 3, a front view of one of the disk gangs 44 described above with reference to FIGS. 1 and 2 having components of a sensing assembly installed relative thereto is illustrated. As shown in FIG. 3, the disk gang 44 may include a disk gang shaft (e.g., as indicated with dashed lines 56) that extends along an axial direction of the disk gang 44 (e.g., as indicated by arrow 58) between a first end 60 and a second end 62. The disk gang shaft 56 may be positioned below the support arm 48 of the disk gang 44 along a vertical direction (e.g., as indicated by arrow 66) of the implement 10 and supported relative to the support arm 48 by one or more hangers 68, However, in alternative embodiments, the disk gang shaft 56 may have any other suitable orientation. Each disk blade 46 may be rotatably coupled or keyed to the disk gang shaft 56. The disk gang shaft 56 defines a rotational axis (e.g., as indicated by dashed line 55) about which the coupled disk blades 46 rotate. Each disk blade 46 may be spaced apart from an adjacent disk blade 46 in the axial direction 58 via spools 59 by a distance X1. An open space 107 is thus defined between each pair of adjacent disk blades 46 in the axial direction 58.

Figure 4:
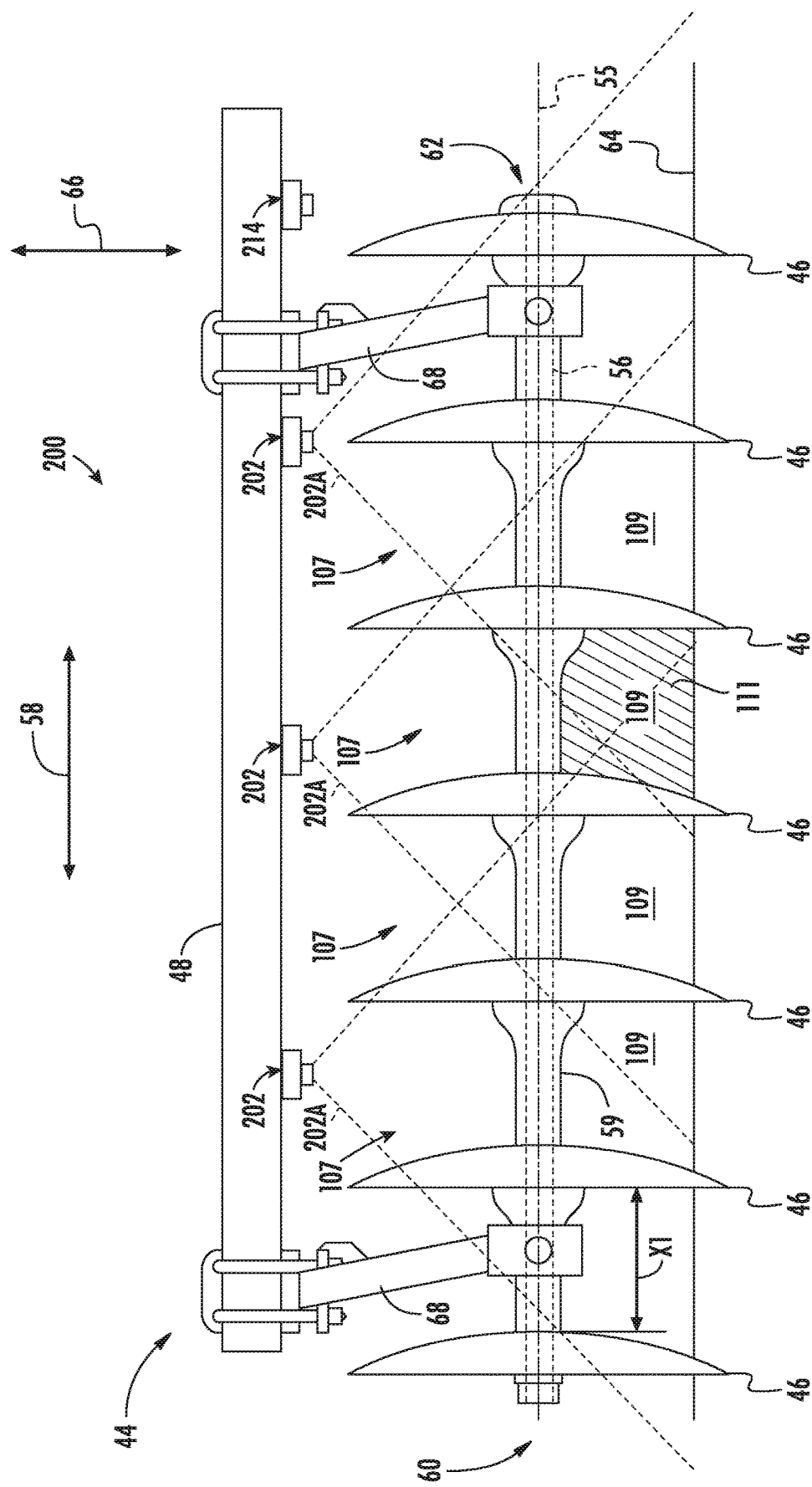
FIG. 4 illustrates another front view of the ground engaging assembly and sensing assembly shown in FIG. 3 in accordance with aspects of the present subject matter, particularly illustrating the presence of material accumulation relative to the ground engaging assembly.

As the implement 10 is moved across a field, the disk blades 46 may be configured to penetrate the soil surface (e.g., as indicated by line 64) of the field and rotate about the rotational axis relative to the soil within the field such that field materials flow through the open spaces 107. It should be appreciated that during normal, non-plugged operation of the disk gang 44, substantially all of the field materials being processed by the disk gang 44 flow through the open spaces 107, particularly through portion(s) of open spaces 107 defined below the rotational axis 55 (i.e., through lower flow zone(s) 109), with only an occasional piece of residue, dirt clod, rock, and/or the like flowing above the disk gang shaft 56. For example, as shown in FIG. 4, field materials flow below the rotational axis 55, within the flow zone 109, during normal operation of the disk gang 44.

In certain instances, however, a plugged operating condition may occur in which field materials accumulate within the flow zone(s) 109. For example, when the soil in the field has high moisture content, the soil may stick or adhere to the disk blades 46 such that the soil accumulates within the associated flow zone(s) 109. Moreover, a large chunk of residue or a rock may become lodged between a pair of adjacent disk blades 46 in a manner that inhibits the flow of field materials through the associated flow zone(s) 109, thereby causing additional field materials to accumulate therein. As such, the disk blades 46 may become plugged and not perform as intended.

In accordance with aspects of the present subject matter, a sensing assembly 200 may be associated with the disk gang 44 for detecting the temperature gradient of the field materials at the disk blades 46, which may be indicative of changes in the amount of residue accumulation on the disk blades 46. In several embodiments, the sensing assembly 200 may include one or more infrared sensors 202 positioned relative to the disk gang 44 such that each infrared sensor 202 is configured to provide data indicative of a plugged operating condition of the associated disk blade(s) 46. For example, as shown in FIG. 3, the sensing assembly 200 has three infrared sensors 202. In several embodiments, the infrared sensors 202 may be installed or otherwise positioned on the toolbar 48 of the disk gang 44 such that a field of view 202A of each infrared sensor 202 is directed towards the associated disk blades 46. However, it should be appreciated that the infrared sensors 202 may additionally or otherwise be supported on and/or coupled to any other suitable component of or location on the implement 10, such as another frame member of the implement 10, or the work vehicle 12, such that the field of view 202A of each infrared sensor 202 is directed towards the associated disk blades 46.

Generally, the infrared sensors 202 may be configured to capture heat data associated with the heat of the field materials at the associated disk blades, which may generally be indicative of the temperature gradient of the field materials at the associated disk blades. For instance, in one embodiment, the infrared sensors 202 are infrared cameras configured to capture infrared images of the disk blades 46 and surrounding field materials present within the associated field of view 202A at the field surface. Such infrared images may be indicative of the temperature gradient of the field materials present on and/or flowing past the disk blades 46. Infrared cameras are less sensitive to dust generated during agricultural operations than standard cameras, and thus, may provide clearer images of the disk gang 44. However, in alternative embodiments, the infrared sensors 202 may be configured as any other suitable infrared detecting device. For instance, in one embodiment, the infrared sensors 202 may be configured as an infrared pyrometer.

During normal, non-plugged operation of the disk blades 46, where little to no material accumulation has built up on and/or between the disk blades 46, the infrared sensors 202 may detect approximately the same heat signature pattern across all of the disk blades 46. Particularly, the infrared sensors 202 may detect areas with warmer temperatures, indicative of residue, and areas with cooler temperatures, indicative of the soil that was previously below the residue layer, as the disc blades 46 move through the field, which provides a typical or expected temperature gradient between the warmer and cooler field materials. Accordingly, during such normal, non-plugged operation, the monitored temperature gradients of the field materials at the disk blades 46 should generally be equal to each other and also generally equal to a temperature gradient threshold over a period of time. The temperature gradient threshold may, in one embodiment, be selected based at least partially on at least one of the temperature of the soil layer in the field or the temperature of the residue on the field surface. However, as will be described below in greater detail, when the temperature gradients of the field materials at the disk blades 46 are not substantially equal to each other, or are substantially less than the temperature gradient threshold, a plugged operating condition of one or more of the disk blades 46 may be inferred or estimated. It should be appreciated that, in some embodiments, the temperature gradient is more qualitative, based on the scale difference within the data received by the infrared sensor 202, such that the numerical temperature differential between the warmer and cooler field materials is not required. However, in other embodiments, the data received by the infrared sensor 202 may be calibrated, e.g., using one or more temperature readings within the field, such that the temperature gradient is more quantitative and provides a numerical temperature differential between the warmer and cooler field materials.

In some embodiments, one or more temperature sensors 214 may be provided in operative association with the implement 10. Generally, as indicated above, the temperature gradient threshold may be selected based at least partially on a temperature of the soil or a temperature of the residue within the field. In several embodiments, the temperature sensor(s) 214 may generally be configured to detect a parameter associated with the temperature of the soil and/or the temperature of the residue within the field across which the implement 10 is being moved. In one embodiment, the temperature sensor(s) 214 may be configured as a non-contact temperature sensor, such as another infrared sensor(s). However, it should be appreciated that, in alternative embodiments, the temperature sensor(s) 214 may be configured as any other suitable device for sensing or detecting the temperature of the soil and/or residue, such as a contact resistance sensor or any other contact-based sensing device configured to engage or contact the soil and/or residue as the implement 10 is towed across the field. The temperature sensor(s) 214 may be configured to transmit the temperature data to a controller 252 for subsequent processing and/or analysis. Further, in some embodiments, the temperature data received from the temperature sensor(s) 214 may be used to calibrate the infrared sensors 202.

Referring now to FIG. 4, an exemplary view of a ground engaging assembly (e.g., the disk gang 44 shown in FIG. 3) is illustrated in accordance with aspects of the present subject matter. More particularly, FIG. 4 illustrates a front view of the disk gang 44 and sensing assembly 200 described above with reference to FIG. 3 while the disk gang 44 is experiencing a plugged operating condition where excessive material accumulation 111 has built up within one of the flow zones 109. The sensing assembly 200 may be used to monitor the temperature gradient of the field materials at the disk blades 46, with the monitored temperature gradient being indicative of the amount of material accumulation 111 accumulated on and/or between the disk blades 46. In general, as more material accumulation 111 builds up within one of the Open spaces 107, the monitored temperature gradient at the disk blades 46 associated with the plugged open space 107 (e.g., the temperature associated with the field materials surrounding the disk blades 46) should be smaller over a given time period than when no material accumulation is present over the given time period. For example, with reference to FIG. 4, the infrared sensors 202 may detect warmer areas more consistently and frequently than cooler areas at the disk blades 46 associated with the material accumulation 111 and/or at the open space 107 defined therebetween in which the material accumulation 111 has accumulated, which leads to a smaller temperature gradient than at the areas associated with the disk blades 46 with no material accumulation built up relative thereto.

As such, the areas with smaller temperature gradients are indicative of a plugged condition of the associated disk blades 46.

It should be appreciated that, while the sensing assembly 200 has been described as having three infrared sensors 202, the sensing assembly 200 may include any other suitable number of infrared sensors 202 such that the temperature gradient of field materials at each of the disk blades 46 of a disk assembly can be monitored. For instance, in one embodiment, the sensing assembly 200 may include one, two, or four or more infrared sensors 202. Further, it should be appreciated that while only one sensing assembly 200 has been described herein with reference to determining plugging or material accumulation on disk blades 46 of a disk gang 44 of a tillage implement 10, multiple sensing assemblies 200 may be associated with a disk gang 44. For instance, in one embodiment, any suitable number of sensing assemblies 200 may be provided in operative association with a disk gang 44 such that the temperature gradient of field materials at each of the disk blades 46 can be monitored. Additionally, it should further be appreciated that, while the sensing assembly 200 has generally been described herein with reference to determining a plugged operating condition of disk blades 46 of a disk gang 44 of a tillage implement 10, the sensing assembly 200 may be configured to be associated with any other ground engaging tools or ground engaging assemblies of any suitable agricultural implement.

Figure 5:
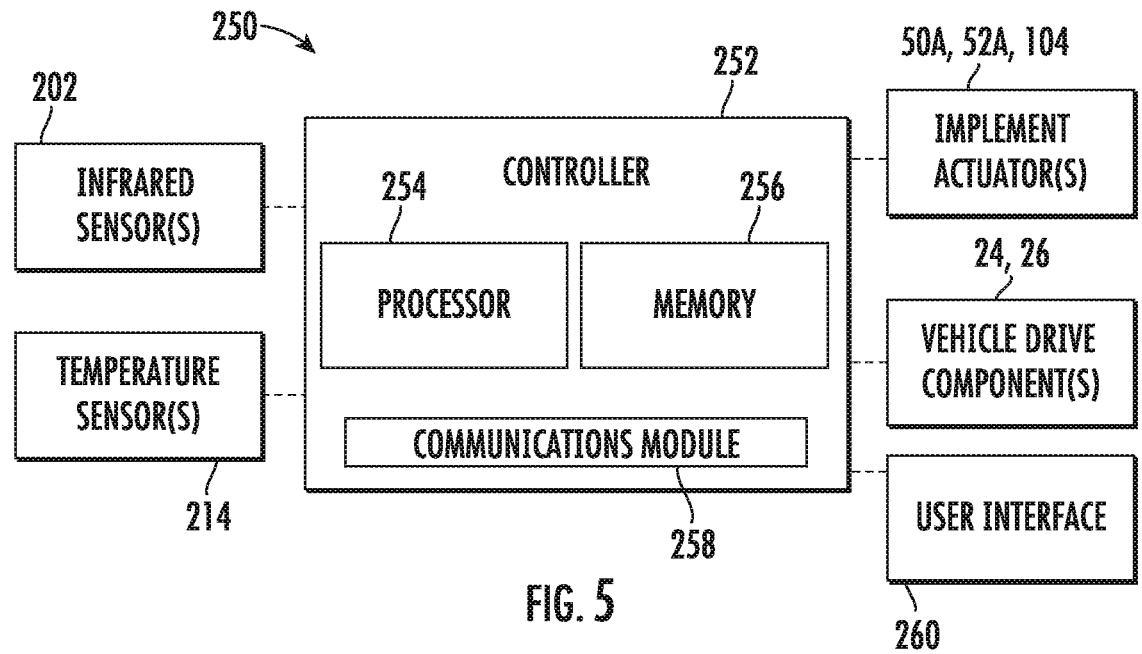
FIG. 5 illustrates a schematic view of one embodiment of a system for managing material accumulation relative to ground engaging tools of an agricultural implement in accordance with aspects of the present subject matter.

Referring now to FIG. 5, a schematic view of one embodiment of a system 250 for managing material accumulation relative to ground engaging tools of an agricultural implement is illustrated in accordance with aspects of the present subject matter. In general, the system 250 will be described herein with reference to the implement 10 described above with reference to FIGS. 1 and 2 and the sensing assembly 200 described above with reference to FIGS. 3 and 4. However, it should be appreciated by those of ordinary skill in the art that the disclosed system 250 may generally be utilized with agricultural implements having any other suitable implement configuration and/or with ground engaging assemblies/tools having any other suitable assembly/tool configuration.

As shown in FIG. 5, the system 250 may include a controller 252 configured to electronically control the operation of one or more components of the agricultural implement 10. In general, the controller 252 may comprise any suitable processor-based device known in the art, such as a computing device or any suitable combination of computing devices. Thus, in several embodiments, the controller 252 may include one or more processor(s) 254, and associated memory device(s) 256 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 256 of the controller 252 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 256 may generally be configured to store suitable computer-readable instructions that, when implemented by the processor(s) 254, configure the controller 252 to perform various computer-implemented functions, such as one or more aspects of the methods and algorithms that will be described herein. In addition, the controller 252 may also include various other suitable components, such as a communications circuit or module, one or more input/output channels, a data/control bus and/or the like.

It should be appreciated that, in several embodiments, the controller 252 may correspond to an existing controller of the agricultural implement 10 and/or of the work vehicle 12 to which the implement 10 is coupled. However, it should be appreciated that, in other embodiments, the controller 252 may instead correspond to a separate processing device. For instance, in one embodiment, the controller 252 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 252 may be configured to include a communications module or interface 258 to allow for the controller 252 to communicate with any of the various other system components described herein. For instance, the controller 252, in several embodiments, be configured to receive data inputs from one or more sensors of the agricultural implement 10 that are used to detect one or more parameters associated with material accumulation relative to the associated ground engaging assembly. Particularly, the controller 252 may be in communication with one or more sensors configured to detect parameters indicative of material accumulation on ground engaging tools of the associated ground engaging assembly. For instance, the controller 252 may be communicatively coupled to one or more infrared sensor(s) 202 and/or one or more temperature sensor(s) 214 via any suitable connection, such as a wired or wireless connection, to allow data indicative of material accumulation on the ground engaging tools to be transmitted from the sensor(s) 202, 214 to the controller 252.

Specifically, referring back to FIGS. 3 and 4, each sensing assembly 200 may, for example, include or be associated with infrared sensors 202 installed or otherwise positioned relative to ground engaging tools to capture data (e.g., heat data) indicative of the temperature gradient of the field materials at the ground engaging tools, which in turn, is indicative of material accumulation relative to the ground engaging tools (e.g., disk blades 46, 46', leveling disks 52, shanks 50, etc.) of the implement 10. Additionally, in some embodiments, the implement 10 may be associated with one or more temperature sensor(s) 214 configured to detect the temperature of the soil and/or residue within the field at the location of the implement 10. Thus, in several embodiments, the controller 252 may be configured to determine the presence and/or amount of material accumulation relative to the ground engaging tools based on the data received from the sensor(s) 202, 214. For example, the controller 252 may include one or more suitable algorithms stored within its memory 256 that, when executed by the processor 254, allow the controller 252 to infer or estimate the presence and/or amount of material accumulation relative to the ground engaging tools based on the data received from the sensor(s) 202, 214.

For instance, in some embodiments, the controller 252 may include one or more algorithms that compare a detected temperature gradient of the field materials at the ground engaging tools to a temperature gradient threshold to determine the presence of material accumulation. For example, the controller 252 may compare the determined temperature gradient to at least one predetermined temperature gradient threshold corresponding to a severity of the material accumulation between the adjacent ground engaging tools. It should be appreciated that, in some embodiments, the temperature gradient threshold(s) may be selected based on experimental results for different levels of plugging of the ground engaging tools. Additionally, as indicated above, the temperature gradient threshold(s) may be selected based on the temperature of the residue and/or the temperature of the soil within the field.

In one embodiment, the temperature gradient threshold(s) may include a maximum temperature gradient threshold, which corresponds to a temperature gradient between the temperatures of the field materials at the ground engaging tools when the ground engaging tools first begin to move through the soil within the field. As such, the maximum temperature gradient threshold is an indicator of a normal operating condition of the ground engaging tools, below which material accumulation is present relative to the associated ground engaging tool(s). In one embodiment, the temperature gradient threshold(s) may include an intermediate temperature gradient threshold, which corresponds to a temperature gradient between the temperatures of the field materials at the ground engaging tools during a partially or less severe plugged operating condition of the ground engaging tools, below which removal actions may need to be performed. Additionally, in some embodiments, the temperature gradient threshold(s) may include a minimum temperature gradient threshold, which corresponds to a temperature gradient between the temperatures of the field materials at the ground engaging tools during a severe or fully plugged operating condition of the ground engaging tools with excessive material accumulation built up on and/or between the ground engaging tools creating, at or below which removal actions need to be performed. Based on the comparison of the detected temperature gradient to the temperature gradient threshold(s), the presence of material accumulation relative to the associated ground engaging tools and the severity of such material accumulation, may be determined.

Similarly, in some embodiments, the controller 252 may determine the presence of material accumulation relative to the ground engaging tools when the detected temperature gradient of the field materials at one ground engaging tool differs from the temperature gradient of the field materials at another ground engaging tool. For instance, the controller 252 may determine that one ground engaging tool is plugged when the temperature gradient at the ground engaging tool is lower than the temperature gradient of the other e.g., unplugged) tool by a given amount. For instance, the controller 252 may include one or more algorithms that compare a differential between the detected temperature gradients of the field materials at the compared ground engaging tools to one or more predetermined differential thresholds associated with the presence of material accumulation relative to the ground engaging tools and determine that one or more of the tools being compared is plugged when the differential between the detected temperature gradients of the field materials at the compared ground engaging tools is greater than one or more of the predetermined differential thresholds. For example, the controller 252 may compare the determined temperature gradient differential to at least one predetermined differential threshold corresponding to a severity of the material accumulation between the adjacent ground engaging tools, similar to the different temperature gradient thresholds described above. It should be appreciated that, in some embodiments, the gradient differential threshold(s) may be selected based on experimental results for different levels of plugging of the ground engaging tools.

In embodiments where the infrared sensor 202 is configured as an infrared camera, the controller 252 may determine the presence of material accumulation relative to the ground engaging tools when an infrared image received from the infrared camera differs from a baseline image. For instance, the baseline image may correspond to the heat signature from the area surrounding one or more of the ground engaging tools of the implement when material accumulation is not present relative to the pictured ground engaging tools. Generally, the baseline image will have small, higher heat areas at the ground engaging tools corresponding to the higher heat provided by residue and larger, lower heat areas corresponding to the lower heat provided by soil surrounding the higher heat areas. As material starts to accumulate relative to the ground engaging tools, the infrared images received may show larger and/or more numerous higher heat areas at the ground engaging tools and smaller lower heat areas. As such, the controller 252 may be configured to compare the number and/or size of higher heat areas associated with residue with the number and/or size of lower heat areas associated with soil and determine the presence of material accumulation relative to ground engaging tools when the number and/or size of higher heat areas exceed the number and/or size of lower heat areas.

The controller 252 may further confirm or determine the existence of a plugged condition by monitoring a frequency or a period at which the material accumulation is detected. For instance, the controller 252 may compare the frequency or the period at which the excessive material accumulation is detected to a frequency threshold or a period threshold corresponding to a persistence of the material accumulation relative to the ground engaging tools, and/or the like. For example, the controller 252 may determine that a plugged operating condition exists when the detected temperature gradient is below the temperature gradient threshold(s) more frequently than the frequency threshold and/or for periods longer than the period threshold. The controller 252 may further use a combination of such thresholds to further verify the likelihood of plugging.

The controller may further be configured to perform one or more implement-related control actions based on the data received from the sensor(s) 202, 214. Specifically, the controller 252 may be configured to control one or more components of the agricultural implement 10 on the determination of the presence of excessive material accumulation or a plugging condition relative to the ground engaging tools. For example, when the ground engaging tools correspond to disk blades of a disk gang, such as the disk blades 46 of the disk gang 44, the controller 252 may be configured to control the disk gang actuator(s) 104 associated with the disk gang 44 as shown in FIG. 5. For instance, the controller 252 may be configured to control the disk gang actuator(s) 104 to adjust a penetration depth of the disk blades 46 of the disk gang 44, which may help reduce the amount of material accumulation formed relative to the disk blades 46. Similarly, when the ground engaging tools correspond to shanks, such as the shanks 50, the controller 252 may be configured to control the shank frame actuator(s) 50A associated with the shanks 50, as shown in FIG. 5, to adjust the penetration depth of the shanks 50 and reduce the amount of material accumulation formed relative to the shanks 50. Additionally, the controller 252 may be configured to control the leveling disk actuator(s) 52A. For instance, the controller 252 may be configured to control the leveling disk actuator(s) 52A to adjust a penetration depth of the leveling disks 52 to help reduce the amount of material accumulation formed relative to the leveling disks 52.

Further, in some embodiments, the controller 252 may be configured to indicate to an operator the presence of material accumulation and/or one or more parameters associated with the material accumulation determined relative to the ground engaging tools. For example, in the embodiment shown in FIG. 5, the communications module 258 may allow the controller 252 to communicate with a user interface 260 having a display device configured to display information regarding the presence of material accumulation (e.g., amount, frequency, duration, patterns, and/or the like) determined relative to the ground engaging tools. However, it should be appreciated that the controller 252 may instead be communicatively coupled to any number of other indicators, such as lights, alarms, and/or the like to provide an indicator to the operator regarding the presence of material accumulation relative to the ground engaging tools.

Additionally or alternatively, in some embodiments, the controller 252 may be configured to perform one or more vehicle-related control actions based on the determination of a plugging condition relative to the ground engaging tools. For example, as shown in FIG. 5, in some embodiments, the controller 252 may be configured to control the operation of one or more vehicle drive components configured to drive the vehicle 12 coupled to the implement 10, such as the engine 24 and/or the transmission 26 of the vehicle 12. In such embodiments, the controller 252 may be configured to control the operation of the vehicle drive component(s) 24, 26 based on the determination of the material accumulation, for example, to slow down the vehicle 12 and implement 10 or bring the vehicle 12 and implement 10 to a stop when it is determined that the material accumulation is excessive.

It should be appreciated that, depending on the type of controller 252 being used, the above-described control actions may be executed directly by the controller 252 or indirectly via communications with a separate controller. For instance, when the controller 252 corresponds to an implement controller of the implement 10, the controller 252 may be configured to execute the implement-related control actions directly while being configured to execute the vehicle-related control actions by transmitting suitable instructions or requests to a vehicle-based controller of the vehicle 12 towing the implement 10 (e.g., using an ISObus communications protocol). Similarly, when the controller 252 corresponds to a vehicle controller of the vehicle towing the implement 10, the controller 252 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 252 may be configured to execute both the implement-based control actions and the vehicle-based control actions directly or the controller 252 may be configured to execute both of such control action types indirectly via communications with a separate controller.

Figure 6:
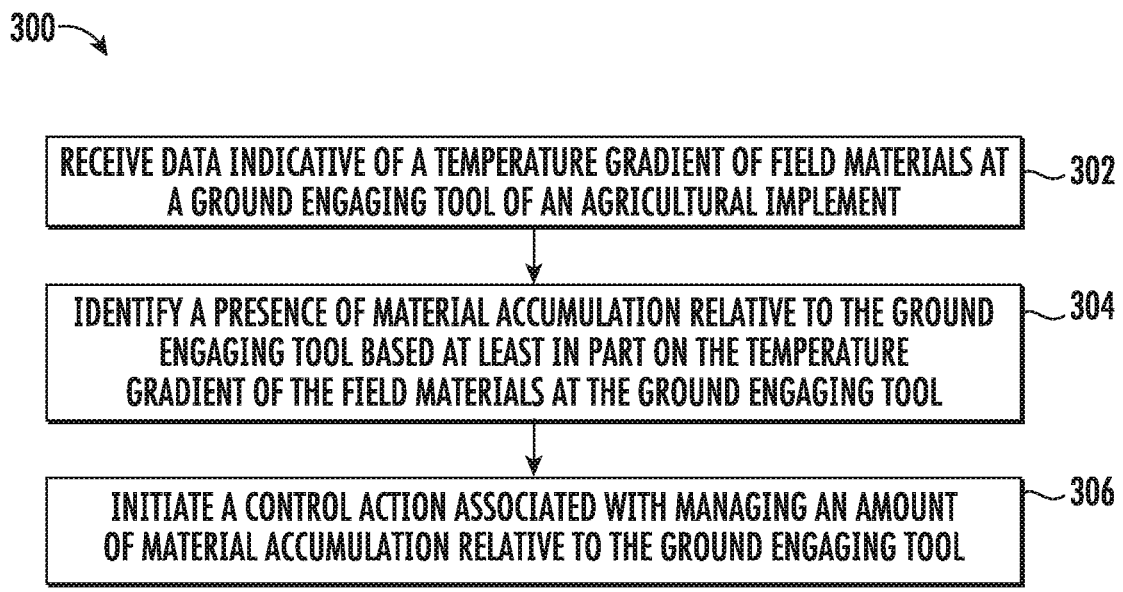
FIG. 6 illustrates a method for managing material accumulation relative to ground engaging tools of an agricultural implement in accordance with aspects of the present subject matter.

Referring now to FIG. 6, a flow diagram of one embodiment of a method 300 for managing material accumulation relative to ground engaging tools of an agricultural implement is illustrated in accordance with aspects of the present subject matter. In general, the method 300 will be described herein with reference to the implement 10 and the work vehicle 12 shown in FIGS. 1 and 2, the sensing assembly 200 shown in FIGS. 3-4, as well as the various system components shown in FIG. 5. However, it should be appreciated that the disclosed method 300 may be implemented with work vehicles and/or implements having any other suitable configurations and/or within systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the method disclosed herein can be omitted, rearranged, combined, and/or adapted in various ways without deviating from the scope of the present disclosure.

As shown in FIG. 6, at (302), the method 300 may include receiving data indicative of a temperature gradient of field materials at a ground engaging tool of the agricultural implement. For instance, as indicated above, the controller 252 may receive heat data from an infrared sensor 202 corresponding to the temperature gradient of the field materials at the ground engaging tool (e.g., disk blade 46).

Moreover, as shown at (304), the method may include identifying a presence of material accumulation relative to the ground engaging tool based at least in part on the temperature gradient of the field materials at the ground engaging tool and the temperature of soil within the field. For instance, in one embodiment, the controller 202 may identify the presence of material accumulation when the temperature gradient of the field materials at the ground engaging tool is less than one or more of the temperature gradient thresholds.

Additionally, as shown at (306), the method 300 may include initiating a control action associated with managing an amount of material accumulation relative to the ground engaging tool. For instance, as indicated above, the controller 252 may be configured to control the operation of an actuator 104, 50A, 52A of the implement 10 to adjust the penetration depth of the respective ground engaging tool(s) (e.g., disk blades 44, shanks 50, leveling disks 52) and/or to control the operation of the vehicle drive component(s) 24, 26 of the vehicle 12 towing the implement 10 to slow down or stop the implement 10. In some embodiments, the controller 252 may indicate to an operator of material accumulation relative to one or more of the ground engaging tools, e.g., by controlling the operation of the user interface 260 to display information relating to the operating condition of the ground engaging tools.

It is to be understood that the steps of the method 300 are performed by the controller 252 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 252 described herein, such as the method 300, is implemented in software code or instructions which are tangibly stored on a tangible computer readable medium. The controller 252 loads the software code or instructions via a direct interface with the computer readable medium or via a wired and/or wireless network. Upon loading and executing such software code or instructions by the controller 252, the controller 252 may perform any of the functionality of the controller 252 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for managing material accumulation relative to an agricultural implement, the system comprising:
   a ground engaging tool supported on an agricultural implement;
   an infrared sensor having a field of view directed towards the ground engaging tool, the infrared sensor being configured to generate data indicative of a temperature gradient of field materials at the ground engaging tool; and
   a controller communicatively coupled to the infrared sensor, the controller being configured to monitor the data received from the infrared sensor and determine a presence of material accumulation relative to the ground engaging tool based at least in part on the temperature gradient of the field materials at the ground engaging tool.

2. The system of claim 1, wherein the controller is configured to compare the temperature gradient to a predetermined gradient threshold and identify the presence of material accumulation relative to the ground engaging tool when the temperature gradient falls below the predetermined gradient threshold.

3. The system of claim 2, wherein the controller is configured to determine the presence of material accumulation relative to the ground engaging tool when the temperature gradient of the field materials at the ground engaging tool falls below the predetermined gradient threshold for a given period of time.

4. The system of claim 2, wherein the predetermined gradient threshold is selected based on at least one of a temperature of soil within the field or a temperature of residue within the field.

5. The system of claim 1, wherein the ground engaging tool comprises a first ground engaging tool, the system further comprising a second ground engaging tool, wherein the controller is configured to compare the temperature gradient of the field materials at the first ground engaging tool to a temperature gradient of field materials at the second ground engaging tool.

6. The system of claim 5, wherein the controller is configured to determine the presence of material accumulation relative to the first ground engaging tool when the temperature gradient of the field materials at the first ground engaging tool differs from the temperature gradient of field materials at the second ground engaging tool by a predetermined threshold differential.

7. The system of claim 1, wherein the infrared sensor comprises an infrared camera.

8. The system of claim 1, wherein the controller is further configured to initiate a control action based at least in part on the determination of the presence of material accumulation relative to the ground engaging tool.

9. The system of claim 8, wherein the control action comprises controlling an operation of an actuator provided in operative association with the agricultural implement to adjust a penetration depth of the ground engaging tool.

10. The system of claim 8, wherein the control action comprises notifying an operator of the agricultural implement of the material accumulation relative to the ground engaging tool.

11. A method for managing material accumulation relative to an agricultural implement as the agricultural implement performs an agricultural operation within a field, the method comprising:
receiving, with a computing device, data indicative of a temperature gradient of field materials at a ground engaging tool of the agricultural implement;
identifying, with the computing device, a presence of material accumulation relative to the ground engaging tool based at least in part on the temperature gradient of the field materials at the ground engaging tool; and
initiating, with the computing device, a control action associated with managing an amount of material accumulation relative to the ground engaging tool.

12. The method of claim 11, further comprising comparing, with the computing device, the temperature gradient to a predetermined gradient threshold.

13. The method of claim 12, wherein identifying the presence of material accumulation relative to the ground engaging tool comprises identifying the presence of material accumulation when the temperature gradient falls below the predetermined Gradient threshold.

14. The method of claim 12, wherein the predetermined gradient threshold is selected based on at least one of a temperature of soil within the field or a temperature of residue within the field.

15. The method of claim 11, wherein the ground engaging tool comprises a first ground engaging tool, the method further comprising receiving data indicative of a temperature gradient of field materials at a second ground engaging tool of the agricultural implement and comparing the temperature gradient of the field materials at the first ground engaging tool to the temperature gradient of field materials at the second ground engaging tool.

16. The method of claim 15, wherein identifying the presence of material accumulation relative to the first ground engaging tool comprises identifying the presence of material accumulation when the temperature gradient of the field materials at the first ground engaging tool differs from the temperature gradient of field materials at the second ground engaging tool by a predetermined threshold differential.

17. The method of claim 11, wherein the data indicative of the temperature gradient of field materials is received from an infrared sensor.

18. The method of claim 17, wherein the infrared sensor comprises an infrared camera.

19. The method of claim 11, wherein the control action comprises controlling an operation of an actuator to adjust a penetration depth of the ground engaging tool.

20. The method of claim 11, wherein the control action comprises notifying an operator of the agricultural implement of the material accumulation relative to the ground engaging tool.

* * * * *